United States Patent
Endo

(10) Patent No.: US 12,496,900 B2
(45) Date of Patent: Dec. 16, 2025

(54) IN-VEHICLE FUEL TANK DEVICE AND UTILITY VEHICLE

(71) Applicant: Kubota Corporation, Osaka (JP)

(72) Inventor: Yusuke Endo, Sakai (JP)

(73) Assignee: Kubota Corporation, Osaka (JP)

( * ) Notice: Subject to any disclaimer, the term of this patent is extended or adjusted under 35 U.S.C. 154(b) by 8 days.

(21) Appl. No.: 18/619,516

(22) Filed: Mar. 28, 2024

(65) Prior Publication Data

US 2024/0343109 A1 Oct. 17, 2024

(30) Foreign Application Priority Data

Apr. 17, 2023 (JP) .................................. 2023-067252

(51) Int. Cl.
*F02M 37/44* (2019.01)
*B60K 15/03* (2006.01)
*F02M 37/10* (2006.01)

(52) U.S. Cl.
CPC ..... *B60K 15/03006* (2013.01); *F02M 37/106* (2013.01); *F02M 37/44* (2019.01)

(58) Field of Classification Search
CPC ...... F02M 37/106; F02M 37/44; F02M 37/07; F02M 37/103; F02M 37/20; F02M 37/22; F02M 37/32; F02M 37/54; B60K 15/03006; F02B 61/02
USPC ...................................................... 123/590
See application file for complete search history.

(56) References Cited

U.S. PATENT DOCUMENTS

| | | | | |
|---|---|---|---|---|
| 6,182,640 | B1* | 2/2001 | Nakashima | F02M 37/20 123/514 |
| 6,302,133 | B1* | 10/2001 | Kobayashi | B60K 15/04 141/59 |
| 6,938,409 | B2* | 9/2005 | Birckigt | F01N 3/035 60/275 |
| 9,126,648 | B2* | 9/2015 | Nishimura | B62J 35/00 |
| 2005/0279330 | A1* | 12/2005 | Okazaki | B62J 35/00 137/565.17 |
| 2007/0113832 | A1* | 5/2007 | Kimura | F02M 37/0094 123/520 |
| 2009/0007527 | A1* | 1/2009 | Mitsudou | F02M 37/103 123/514 |
| 2009/0184118 | A1* | 7/2009 | Kobayashi | F02M 37/103 220/62.22 |
| 2012/0060799 | A1* | 3/2012 | Wakabayashi | F02M 37/54 123/495 |
| 2014/0290627 | A1* | 10/2014 | Okada | F02M 37/20 123/495 |

FOREIGN PATENT DOCUMENTS

JP 2018100634 A 6/2018

* cited by examiner

*Primary Examiner* — Hai H Huynh
*Assistant Examiner* — Johnny H Hoang
(74) *Attorney, Agent, or Firm* — The Webb Law Firm

(57) ABSTRACT

An in-vehicle fuel tank device includes an engine; a main tank including a top portion, a side portion, and a bottom portion; and a fuel pump configured to supply fuel to the engine. The bottom portion includes a first area and a second area, at least a portion of the first area having an inclined surface, at least a portion of the second area being depressed to serve as a sub tank configured to receive and store fuel having flown along the inclined surface. The fuel pump includes a suction filter inside the sub tank.

6 Claims, 4 Drawing Sheets

IN-VEHICLE FUEL TANK DEVICE AND UTILITY VEHICLE

CROSS-REFERENCE TO RELATED APPLICATION

This application claims priority to Japanese Patent Application No. 2023-067252 filed Apr. 17, 2023, the disclosure of which is hereby incorporated by reference in its entirety.

BACKGROUND OF THE INVENTION

Field of the Invention

The present invention relates to an in-vehicle fuel tank device configured to supply fuel to a vehicle engine and a utility vehicle including the in-vehicle fuel tank device.

Description of Related Art

An in-vehicle fuel tank includes a fuel pump configured to supply fuel to the engine by sucking in fuel through a suction filter at a lower portion of the tank and discharging the fuel. The vehicle traveling on inclined terrain or making turns moves the surface of fuel in the tank, causing the fuel pump to suck in fuel unstably. To inhibit such a disadvantage, the tank contains a separator or a separate sub tank.

Patent Literature 1, for example, discloses an in-vehicle fuel tank configured to store fuel to be supplied to an engine. The in-vehicle fuel tank includes a tank body, a fuel pump, a fuel filter, and sub tanks. The fuel pump is in the tank body. The fuel filter is connected to the fuel pump and attached to the bottom portion of the tank body. The sub tanks are attached on the upper face side of the fuel filter.

Patent Literature 1

Japanese Unexamined Patent Application Publication, Tokukai, No. 2018-100634

The in-vehicle fuel tank of Patent Literature 1 is configured such that the fuel filter as a suction filter is covered by the sub tanks. This inhibits the fuel suction by the fuel pump from becoming unstable due to a move of the surface of fuel in the tank. The in-vehicle fuel tank, however, includes separate sub tanks fixed to the tank body, with the result of higher costs.

SUMMARY OF THE INVENTION

It is an object of the present invention to provide an in-vehicle fuel tank that inhibits fuel suction by a fuel pump from becoming unstable due to a move of the surface of fuel in the tank and that is simply structured without the need for additional parts and a utility vehicle including the in-vehicle fuel tank.

An in-vehicle fuel tank device as an embodiment of the present invention includes: an engine; a main tank including a top portion, a side portion, and a bottom portion; and a fuel pump configured to supply fuel to the engine, the bottom portion including a first area and a second area, at least a portion of the first area having an inclined surface, at least a portion of the second area being depressed to serve as a sub tank configured to receive and store fuel having flown along the inclined surface, the fuel pump including a suction filter inside the sub tank.

With the above configuration, the main tank has in its bottom portion a depression serving as a sub tank for inhibiting the fuel suction by the fuel pump from becoming unstable due to a move of the surface of fuel in the tank. This is inexpensive as compared to the case of including a sub tank as a separate member. The sub tank is merely a partial depression in the bottom portion of the main tank. Further, the remaining area of the bottom portion has an inclined surface to facilitate fuel flowing into the sub tank. This more effectively inhibits the fuel suction from becoming unstable.

The in-vehicle fuel tank device may, as an embodiment of the present invention, be further configuration such that the sub tank has a flat bottom surface, and the suction filter is a planar filter parallel to the bottom surface. With this configuration, the suction filter lies along the bottom surface of the sub tank, allowing efficient fuel suction even if the sub tank has a small capacity.

The in-vehicle fuel tank device may, as an embodiment of the present invention, be further configuration such that the first area and the second area border on each other in a boundary area in at least a portion of which a barrier protrudes upward from the boundary area. This configuration inhibits fuel in the sub tank from flowing back onto the inclined surface.

The in-vehicle fuel tank device may, as an embodiment of the present invention, be further configuration such that flat portions are disposed between opposite ends of the barrier and the side portion in the boundary area and allow fuel from flowing from the first area to the second area. The flat portions inhibit the barrier from excessively limiting the flow of fuel from the inclined surface into the sub tank, thereby achieving a suitable balance between the flow of fuel into the sub tank and that of fuel out of the sub tank.

Fuel tanks need a breather function. In particular, utility vehicles, which intend to travel on steep slopes and make sharp turns, preferably include a fuel tank with two or more openings each serving as a breather and sufficiently apart from each other. In view of that, the in-vehicle fuel tank device may, as an embodiment of the present invention, be further configuration such that the top portion includes: a fuel supply port for the fuel pump; and a first opening and a second opening disposed on respective opposite sides of the fuel supply port and each serving as a breather.

The present invention may be embodied not only as an in-vehicle fuel tank device but also as a utility vehicle including the in-vehicle fuel tank device. Utility vehicles travel on, for example, rough terrain, rocky soil, lumpy roads, or farmland other than normal roads, and likely enjoy the benefits of the above features and effects of the in-vehicle fuel tank device according to the present invention.

DESCRIPTION OF THE INVENTION

Figure 1:
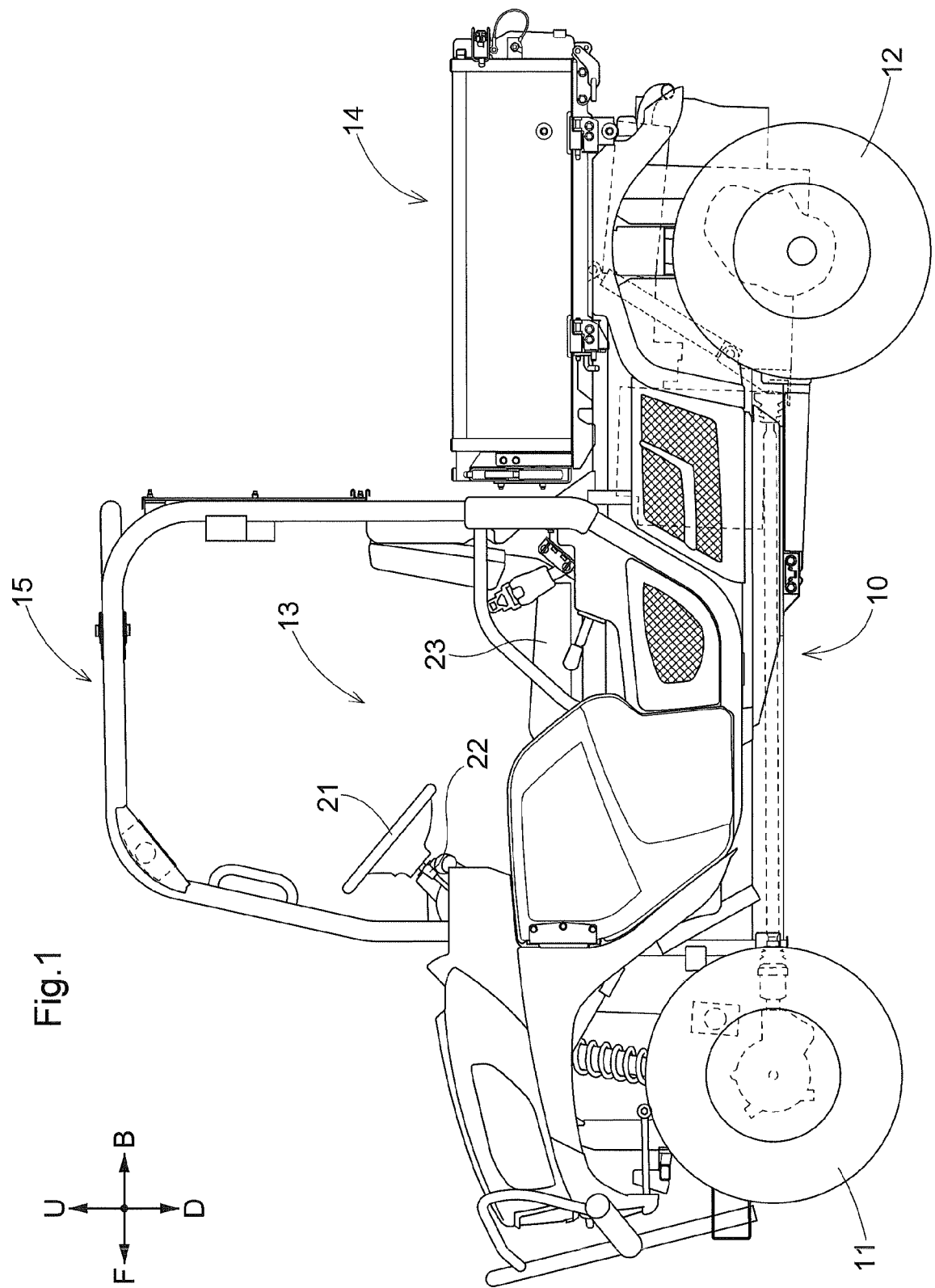
FIG. 1 is a side view of a utility vehicle including an in-vehicle fuel tank device.
Figure 2:
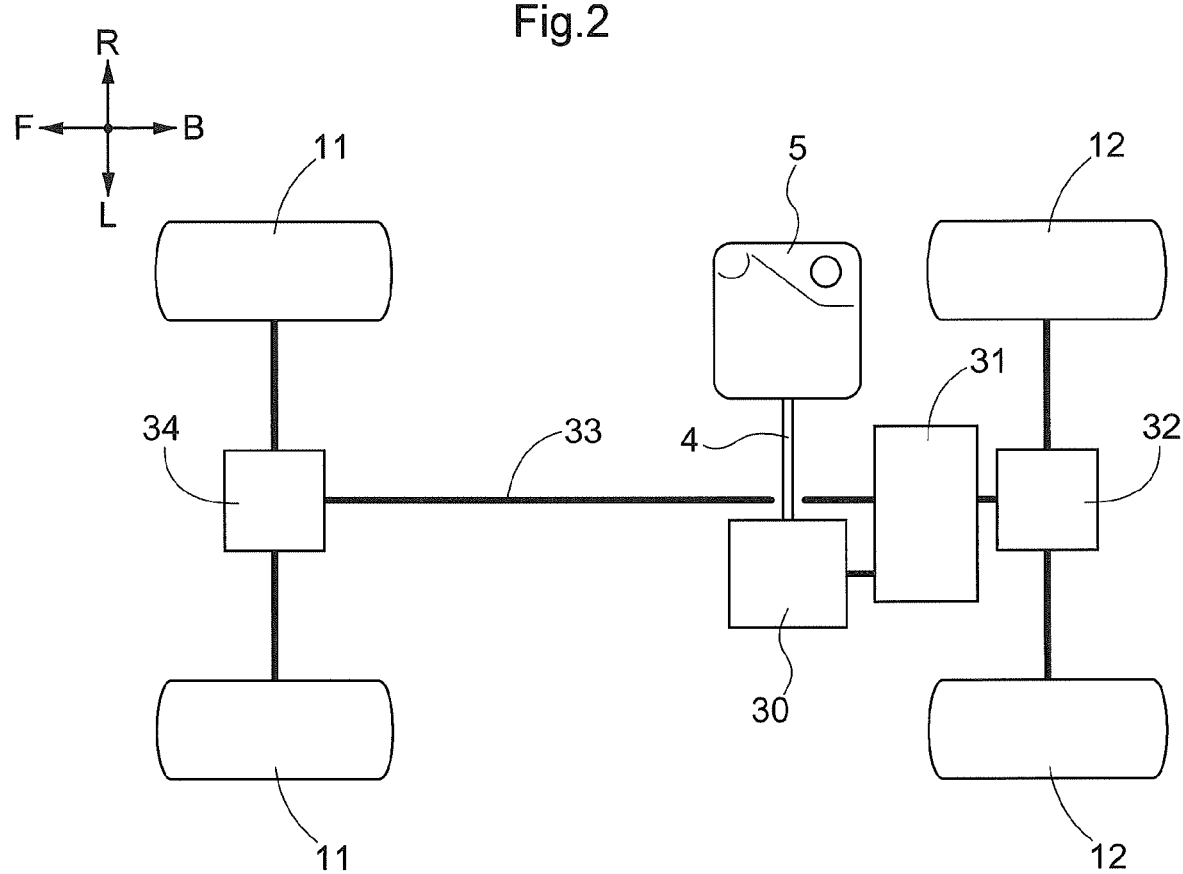
FIG. 2 is a diagram of the motive power system of a utility vehicle as viewed from above.

The description below deals with a utility vehicle including an in-vehicle fuel tank device as an embodiment of the present invention with reference to drawings. FIG. 1 is a side view of the utility vehicle. FIG. 2 is a diagram of the motive power system and fuel system of the utility vehicle as viewed from above. Unless otherwise stated, arrows F and B in FIGS. 1 and 2 indicate the front and back sides, respectively, in the front-back direction of the body (that is, the travel direction); arrows L and R in FIG. 2 indicate the left and right sides, respectively, in the transverse direction of the body; and arrows U and D in FIG. 1 indicate the upward and downward sides, respectively, in the vertical direction of the body (that is the direction of the height from the ground).

The utility vehicle is configured to serve various purposes such as cargo transportation and off-road travel. The utility vehicle includes a body 10 as a frame structure, a pair of left and right drivable and turnable front wheels 11, and a pair of left and right drivable rear wheels 12. The utility vehicle also includes a driver section 13, a carrier box 14, and a roll-over protection system (ROPS) 15. The driver section 13 is disposed above a central portion of the body 10 and configured to accommodate a driver for driving the utility vehicle. The carrier box 14 is disposed above a back portion of the body 10 and configured to receive and dump a cargo. The ROPS 15 defines the driver section 13.

The driver section 13 includes a steering wheel 21 for turning the front wheels 11, a shift lever 22 for shifting gears, a driver's seat 23 for an occupant to sit on as well as other components such as an accelerator pedal (not illustrated in the drawings).

As illustrated in FIG. 2, the utility vehicle includes, as components of the motive power system, an internal combustion engine 30 such as a gasoline engine or a diesel engine (hereinafter referred to simply as "engine 30") and a transmission device 31 configured to vary the output of the engine 30 and transmit the varied output to the front wheels 11 and the rear wheels 12. The transmission device 31 is structured as conventional and is not detailed here. The transmission device 31 is configured to vary the output of the engine 30 at any of different change gear ratios in response to an operation of the shift lever 22. The transmission device 31 outputs motive power to the rear wheels 12 via a rear-wheel differential mechanism 32 and to the front wheels 11 via a propeller shaft 33 and a front-wheel differential mechanism 34.

The utility vehicle includes an in-vehicle fuel tank device 5 (hereinafter referred to simply as "fuel tank 5") lateral to the engine 30. The engine 30 and the fuel tank 5 are connected to each other through a fuel supply path 4, and are below a position near the boundary between the driver's seat 23 and the carrier box 14. The fuel tank 5 contains fuel, and is configured to supply its fuel through the fuel supply path 4 to a fuel injection device or an injector (not illustrated in the drawings). The fuel injection device injects the fuel into an air-intake path of the engine 30 to be supplied into a combustion chamber inside a cylinder of the engine 30.

Figure 3:
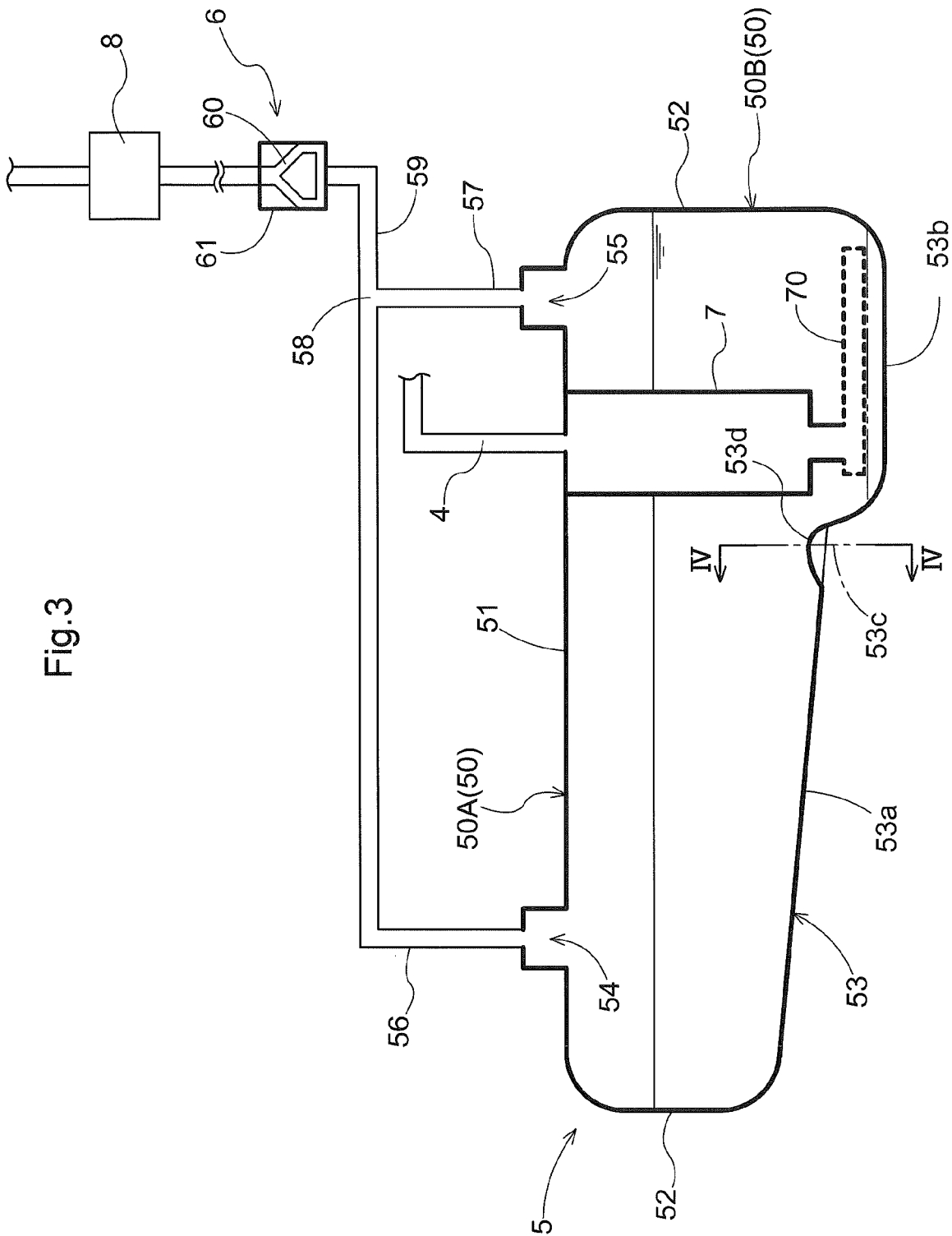
FIG. 3 is a schematic cross-sectional view of an in-vehicle fuel tank device from a lateral side of the vehicle body.

FIG. 3 is a schematic cross-sectional view of the fuel tank 5. The fuel tank 5 includes a tank body 50, a fuel pump 7, and a cutoff valve unit 6. The tank body 50 is in the form of a box including a top portion 51, a side portion 52, and a bottom portion 53 and configured to contain fuel. The tank body 50 includes a main tank section 50A and a sub tank section 50B. The main tank section 50A is made up of the top portion 51, a major part of the side portion 52, and a major part of the bottom portion 53. The sub tank section 50B is made up of a lower back part of the side portion 52 and a back part of the bottom portion 53.

The top portion 51 has a first opening 54 and a second opening 55 each serving as a breather. The fuel tank 5 includes a first pipe 56 connected to the first opening 54, a second pipe 57 connected to the second opening 55, a merge section 58 connected to the first and second pipes 56 and 57, and a merge pipe 59 extending from the merge section 58 to a canister 8 and provided with the cutoff valve unit 6 fitted therein. The cutoff valve unit 6 includes an adapter 61 and a cutoff valve 60. The adapter 61 is in the form of a pipe fitted in the merge pipe 59 to serve as a portion thereof. The cutoff valve 60 is attachable to and detachable from the adapter 61 or from the merge pipe 59 together with the adapter 61. The cutoff valve 60 functions as a common cutoff valve for both the first and second pipes 56 and 57, that is, for both the first and second openings 54 and 55. The first and second openings 54 and 55 are near the front and back ends, respectively, of the top portion 51 in the travel direction. The first and second openings 54 and 55 are thus apart from each other far enough to help prevent fuel from flowing out in response to the body 10 becoming inclined or rolling over. The fuel supply path 4 extends through a portion of the top portion 51 (that is, a fuel supply connection port) which portion is between the first and second openings 54 and 55 and close to the second opening 55.

The bottom portion 53 includes a first area 53a and a second area 53b that are on the front and back sides, respectively, in the travel direction. The first area 53a at least partially has an inclined surface (specifically, with a front portion lifted relative to a back portion). The second area 53b is at least partially so depressed as to receive and store fuel having flown along the inclined surface.

The depressed area serves as the sub tank section 50B. The sub tank section 50B, in other words, includes an open upper portion in communication with the main tank section 50A, and receives and stores fuel having flown along the inclined surface of the first area 53a.

The sub tank section 50B is provided with a suction filter 70 serving as a suction port for the fuel pump 7. The suction filter 70 is a planar filter substantially parallel and proximate to the flat bottom surface of the sub tank section 50B.

Figure 4:
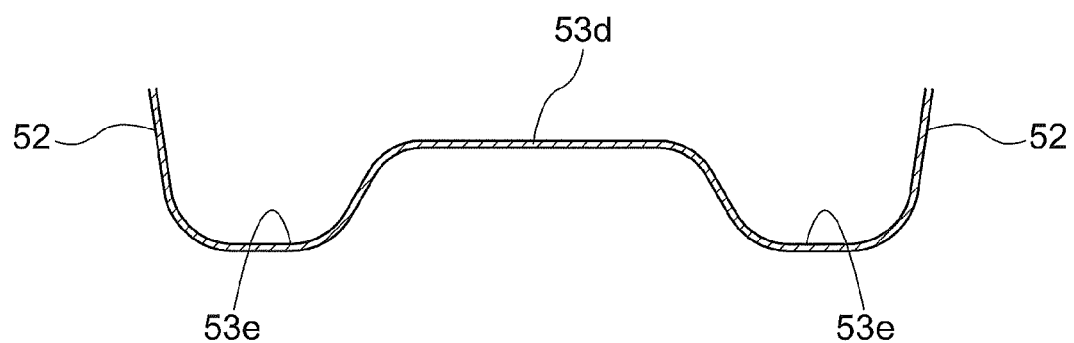
FIG. 4 is a cross-sectional view taken along line IV-IV in FIG. 3, illustrating the contour of a barrier.

FIG. 4 shows the contour of the cross section taken along line IV-IV in FIG. 3. As is clear from FIGS. 3 and 4, the first and second areas 53a and 53b border on each other in a boundary area 53c at least a portion of which is a curved barrier 53d protruding upward from the inclined surface in the boundary area 53c and extending in the transverse direction of the body to inhibit fuel from flowing from the sub tank section 50B into the first area 53a.

Further, as is clear from FIG. 4, the boundary area 53c includes flat portions 53e disposed between the opposite ends of the barrier 53d and the side portion 52 of the tank body 50 and configured to facilitate fuel flowing along the inclined surface of the first area 53a into the sub tank section 50B.

Alternative Embodiments (1) The embodiment described above is configured such that the merge pipe 59 has an end connected to the canister 8. The merge pipe 59 may alternatively have an end directly exposed to the outside.

(2) The embodiment described above is configured such that the barrier 53d is formed by curving a part of the bottom portion 53 in such a manner that the part is continuous with other portions. The barrier 53d may alternatively be a separate member bonded, welded, or otherwise joined to the bottom portion 53 to be integral therewith.

(3) The embodiment described above is configured such that the top portion 51 has two openings each serving as a breather. The top portion 51 may alternatively have three or more openings. The fuel tank 5 may, in this case, include two or more merge sections 58 and cutoff valves 60, but fewer merge sections 58 and cutoff valves 60 than the openings for cost reduction.

(4) The embodiment described above is configured such that the fuel pump 7 includes a body inside the fuel tank 5. The fuel pump 7 may alternatively be outside the fuel tank 5. The fuel pump 7 is, in this case, connected to the suction filter 70 inside the sub tank section 50B through a suction pipe extending through the fuel tank 5.

(5) The embodiment described above is configured such that the fuel tank 5 is proximate to the engine 30. The fuel tank 5 may alternatively be far from the engine 30: It may be at any position such as a front or back portion of the body 10.

(6) The embodiment described above is a utility vehicle including a fuel tank 5 as an embodiment of the present invention. Examples of the utility vehicle include an all-terrain vehicle (ATV), a buggy, an off-road vehicle, an agricultural work vehicle, and a construction vehicle. The fuel tank 5 as an embodiment of the present invention is, of course, mountable in any other vehicle including an internal combustion engine.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

INDUSTRIAL APPLICABILITY

The in-vehicle fuel tank device according to an embodiment of the present invention is mountable in any of various vehicles that use liquid fuel such as gasoline.

REFERENCE SIGNS LIST

1 Front wheel
2 Rear wheel
3 Driver section
4 Fuel supply path
5 Fuel tank
6 Cutoff valve
7 Fuel pump
8 Canister
36 Fuel supply path
50 Tank body
50A Main tank
50B Sub tank
51 Top portion
52 Side portion
53 Bottom portion
53*a* First area
53*b* Second area
53*c* Boundary area
53*d* Barrier
53*e* Flat portion
54 First opening
55 Second opening
56 First pipe
57 Second pipe
58 Merge section
59 Merge pipe
60 Cutoff valve (common cutoff valve)
61 Adapter
70 Suction filter

The invention claimed is:

1. An in-vehicle fuel tank device, comprising:
a tank body, integral with and forming a main tank and a sub tank, the tank body comprising a top portion, a side portion, and a bottom portion; and
a fuel pump configured to supply fuel to an engine, and wherein:
the bottom portion comprises a first area constituting the main tank and a second area constituting the sub tank,
at least a portion of the first area has an inclined surface that becomes lower toward the second area,
at least a portion of the second area is depressed to serve as the sub tank configured to receive and store fuel having flown along the inclined surface, and
the fuel pump comprises a suction filter inside the sub tank
the first area and the second area border on each other in a boundary area in at least a portion of which a barrier protrudes upward from the boundary area and into the tank body such that the barrier inhibits fuel from flowing from the second area to the first area,
the boundary area comprises coplanar flat portions disposed between opposite ends of the barrier and the side portion in the boundary area, and
the flat portions extend from the first area to the second area and allow fuel to flow from the first area to the second area.

2. The in-vehicle fuel tank device according to claim 1, wherein:
the sub tank has a flat bottom surface, and
the suction filter is a planar filter parallel to the bottom surface.

3. The in-vehicle fuel tank device according to claim 1, wherein:
the barrier is convexly curved in a side profile view.

4. The in-vehicle fuel tank device according to claim 3, wherein:
the coplanar flat portions are substantially parallel with the barrier in a cross-sectional view.

5. The in-vehicle fuel tank device according to claim 1, wherein the top portion comprises:
a fuel supply port for the fuel pump; and
a first opening and a second opening disposed on respective opposite sides of the fuel supply port and each serving as a breather.

6. A utility vehicle, comprising:
an engine; and
an in-vehicle fuel tank device according to claim 1.

* * * * *